Patented May 30, 1950

2,509,449

UNITED STATES PATENT OFFICE 2,509,449

PRODUCTION OF BRAN-CONTAINING FOOD PRODUCTS

Morris M. Raymer, Augusta, and Joseph John Thompson, Battle Creek, Mich., assignors to Kellogg Company, Battle Creek, Mich., a corporation of Delaware No Drawing. Application February 13, 1948, Serial No. 8,294

9 Claims. (Cl. 99—83)

This invention relates to the production of palatable bran-containing food products, such as, for example, those of the ready-to-eat breakfast cereal type.

The preparation of bran-containing food products composed either substantially wholly, or in part, of wheat bran or wheat bran-containing material has heretofore been practiced, but in general the resultant food product retains a characteristic branny taste which many consider to be objectionable.

Mere cooking of the bran or bran-containing material, or even cooking thereof with the addition of flavoring materials, such as, for example, sugar, salt, malt extracts and syrups, has been found to be inadequate to remove the characteristic branny taste.

In accordance with the present invention, we have been able to neutralize or eliminate the palatably objectionable character of bran by cooking it in admixture with a minor proportion by weight of malt sprouts.

The malt sprouts of commerce which we employ in the present invention inherently contain certain bitter constituents and are a product obtained by the removal of the sprouts from the malted grain, i. e. barley, together with the malt hulls and foreign material unavoidably present. The sprouts include both acrospires and rootlets and are composed largely of the latter, and have a protein content of about 25%.

Malt sprouts are obtained from malt which may be prepared in the following conventional manner: Barley is steeped in water for several days at a temperature of 50-55° F., with frequent changes of water and aeration to prevent excessive development of bacteria, until the moisture content of the grain is 45-50%. The steeped grain is then spread out or placed in a germination chamber for about a week or more with the temperature held to about 55-60° F., during which time fermentation occurs and germination starts. Germination is permitted until the acrospires are about three-fourths the length of the kernel and the rootlets are fairly short and curly. The product is then kiln dried at temperatures up to about 175° F. to a moisture content of 2-3%, after which the sprouts are rubbed off and separated by sifting. From each 100 pounds of grain, about 3 pounds of sprouts are obtained. In subsequent handling and storage, the moisture content of the sprouts may rise to about 8%.

The separated malt is rich in starch and the enzyme diastase, together with malt sugar produced by the enzyme action, and is ready for use principally in the manufacture of beer. However, malt has a characteristic flavor due to its protein and amino acid content and is also employed in the manufacture of malt extracts and syrups. These malt extracts and syrups are also commonly employed in the preparation of ready-to-eat breakfast cereals. It will be understood, however, that the employment of such malt extracts and syrups, alone or even together with sugar and salt, also conventionally employed in the preparation of such cereal products, is not adequate to neutralize or eliminate the objectionable branny taste character of bran.

The employment of a separately prepared aqueous extract of malt sprouts, obtained by boiling malt sprouts in water and concentrating it, likewise failed to eliminate the palatably objectionable inherent branny character of bran or bran-containing food materials when employed in conventional methods for preparing cereal food products.

As distinguished from the foregoing, and in accordance with the present invention, when we subject bran or bran-containing compositions to pressure cooking in admixture with a small amount of malt sprouts in proportion to the bran and, particularly, the bran crude fibre content, we are able to produce palatable food products which are devoid of the initially inherent palatably objectionable characteristics of each of these components. We believe that this is brought about by chemical reaction during the cooking operation within the confines of the closed cooking vessel between various solutes, distillates and volatilized matter of the two components. Such reaction appears to be indicated by the fact that the final product is further characterized by a novel and palatable taste component.

Wheat bran, such as we may employ in the present invention to form food products composed substantially wholly, or in part, thereof, is generally designated merely as "bran" or sometimes "light bran," and is generally obtained from the last breaks of a wheat mill and contains very little adherent endosperm. This material may have a crude fiber content, on a 10% moisture basis, from about 7.5 to 11%. Heavy bran which we may also employ is generally obtained from the intermediate breaks of a wheat mill, and has somewhat larger amounts of adherent endosperm and has from about 3 to about 7% crude fiber content. Whole wheat may have from about 1.8% to 3% crude fiber content and on the average about 2½%.

In general, the malt sprouts are employed in an amount sufficient only to neutralize the branny taste of the bran material, which may be readily determined by cooking specimens of the two materials in admixture. For example, we employ a typical bran having an 8% bran crude fiber content and we have found that we may employ a mixture of such bran and malt sprouts wherein the proportion of malt sprouts is from 5 to 7.5% by weight of the mixture. We have, however, more particularly found that the optimum proportions of malt sprouts which should be employed so that the branny taste of the bran will be eliminated while at the same time the characteristic taste of the malt sprouts is likewise eliminated, may be correlated to the bran crude fiber content of the bran material in the food product whether it be derived from bran, heavy bran, whole wheat or mixtures thereof. Thus, as will hereinafter be noted, we have determined that the optimum proportions are from 1 part bran crude fiber to 1 part malt sprouts, to 1 part bran crude fiber to 0.65 malt sprouts, all by weight. When employing proportions outside of these ranges, either the branny character of the bran or the bitter character of the malt sprouts may be discerned either by tasting the composite food product dry and, particularly, when tasting with milk.

When preparing the food products of the present invention, the cooking is conventionally conducted in a closed chamber or pressure vessel, such as a rotary steam cooker, to provide agitation at steam pressures of from about 15 to about 25 pounds per square inch steam pressure, although generally a pressure such as 17 to 20 pounds per square inch will be found to be adequate. The amount of cooking water or solution employed and the time period of cooking is generally in proportion to the nature of the materials being cooked and the desired character of the ultimate food product. The cooked materials may be subjected to flaking or shredding operations, followed by toasting to provide food products of a generally conventional ready-to-eat breakfast cereal type, although in the present instance of a novel palatable character. The cooking water or solution employed, particularly in the preparation of the finished food products, to meet consumer taste and appeal may contain varying proportions of sugar, salt, malt wort and spargings. It will be understood that these flavoring materials are not per se effective to neutralize or eliminate the branny character of the bran, in the absence of the cooking in admixture with the indicated portions of malt sprouts. In determining the optimum proportions of malt sprouts to be added so that all of the branny character of the bran would be eliminated without at the same time introducing a residue of objectionable malt sprout taste, the following tests were made:

*Example 1*

92 parts of bran containing 3% crude fiber (on a 10% moisture basis) and being equivalent to 7.36 parts of bran crude fiber were mixed with 8 parts of dry malt sprouts having a 7% moisture content and cooked in the presence of moisture in a pressure cooker, and after removal shredded and toasted to produce a finished product having a definite sprout taste when organoleptically tested in milk. This is due to the fact that the proportion of sprouts to bran crude fiber content was in excess of 1 to 1, that is, the sprouts were in the proportion of 1.085 to 1 part bran crude fiber content.

*Example 2*

95 parts of bran, as employed in Example 1, equivalent to 7.6 parts of bran crude fiber content, was cooked in admixture with 5 parts by weight of malt sprouts, as in Example 1, and produced a finished product which was devoid of both the branny and sprout taste when organoleptically tested in milk. Calculation of the proportion of malt sprouts to bran crude fiber content indicates that in this instance there was present 0.66 part by weight of malt sprouts to 1 part by weight of bran crude fiber content.

*Example 3*

95.25 parts of bran, as in Example 1, cooked in admixture with 4.75 parts of malt sprouts to prepare a food product in a similar manner, gave a food product in which a just perceptible branny taste was detected, indicating an inadequate amount of malt sprouts since here the ratio was 1 part bran crude fiber content to 0.62 part malt sprouts.

*Example 4*

97 parts of the same bran as in Example 1, equivalent to 7.76 parts of bran crude fiber, when cooked with 3 parts of malt sprouts resulted in a food product which had a definite branny taste when organoleptically tested in milk due to the fact that the proportion of materials was here 1 part of bran crude fiber to only 0.388 part malt sprouts.

*Example 5*

In this example, there was employed 45% by weight of bran, as in Example 1, in admixture with 55 parts by weight of whole wheat which has been flaked and ground.

95 parts of this mixture containing 5% crude fiber or 4.75 parts of bran crude fiber was mixed with 5 parts by weight of malt sprouts and cooked and formed into a food product, as in the previous examples. This product had a very slightly perceptible sprout taste in the dry form, but which taste was not evident when the product was organoleptically tested with milk. This was due to the fact that while this mixture contained substantially the maximum ratio of the two components, there was a slight excess of malt sprouts, the proportions being 1 part bran crude fiber to 1.05 parts of malt sprouts, slightly exceeding the maximum ratio of 1 to 1.

*Example 6*

97 parts of the bran-containing material mixture of Example 5, containing 5% crude fiber or 4.85 parts of bran crude fiber, were mixed with 3 parts malt sprouts and which when cooked resulted in a product having a just perceptibly branny taste when organoleptically tested in milk. This product contained 0.62 part malt sprouts to 1 part bran crude fiber, the malt proportion being just below the minimum effective portion thereof, that is, below the optimum ratio for low value of 1 part bran crude fiber to 0.65 part malt sprouts, as hereinbefore indicated.

In all instances where the two components of the food product were present therein in proportions between the optimum high value of 1 part bran crude fiber to 1 part malt sprouts and the optimum low value of 1 part bran crude fiber to 0.65 malt sprouts, the resulting food products were all of a palatable character devoid of the initially inherent palatably objectionable characters of either of these two constituents.

As previously indicated, this neutralization or elimination of the inherent palatably objectionable character of bran by malt sprouts is independent of the presence or absence of other cereals, cereal grain components, food materials, or added flavoring materials or solutions, although flavoring materials and solutions may be added as is normally conventional in the preparation of all food products, and in the present instance flavoring materials and solutions may be added to provide the food products with flavoring conventional to cereals of the breakfast food type.

We claim as our invention:

1. The method of treating bran in the preparation of food products therefrom which comprises cooking the bran in admixture with barley malt sprouts separated from the grain.

2. The method of treating wheat bran in the preparation of food products therefrom which comprises subjecting said bran in admixture with a minor proportion of dried barley malt sprouts separated from the grain and in the presence of moisture to pressure cooking.

3. The method of preparing wheat bran-containing food products and for eliminating the characteristic branny taste of the bran content, which comprises subjecting said food to pressure cooking in the presence of moisture and in admixture with an amount of dried barley malt sprouts separated from the grain sufficient only to neutralize and eliminate said branny taste.

4. The method of preparing a wheat bran-containing food product which comprises cooking it in admixture with dried barley malt sprouts separated from the grain in an amount sufficient to mutually neutralize and eliminate inherent palatably objectionable component content of said bran and said malt sprouts.

5. The method of treating bran in the preparation of food products therefrom which comprises cooking the bran in admixture with barley malt sprouts separated from the grain, said malt sprouts being in the proportion of from 0.65 to 1.0 part by weight per part of bran crude fiber content.

6. The method of preparing wheat bran-containing food products and for eliminating characteristic branny taste resulting from said bran content, which comprises cooking said food material in admixture with dried barley malt sprouts separated from the grain in the proportion of from 0.65 to 1.0 part by weight of said malt sprouts per part by weight of bran crude fiber content.

7. A ready-to-eat breakfast cereal type wheat bran food product of palatable character composed of wheat bran in admixture with a minor proportion of dried barley malt sprouts separated from the grain.

8. A bran food product comprising wheat bran in admixture with barley malt sprouts separated from the grain, said malt sprouts being in the proportion of from 0.65 to 1.0 part by weight per part of bran crude fiber content.

9. A wheat bran-containing food product of the ready-to-eat breakfast cereal type including malt sprouts, in the proportion of from 0.65 to 1.0 part by weight of barley malt sprouts separated from the grain per part of bran crude fiber content, said bran and malt sprouts mutually neutralizing their respective undesirable taste characteristics.

MORRIS M. RAYMER.
JOSEPH JOHN THOMPSON.

REFERENCES CITED

The following references are of record in the file of this patent:

UNITED STATES PATENTS

| Number | Name | Date |
|---|---|---|
| 1,256,634 | Akers | Feb. 19, 1918 |
| 1,264,876 | Graham | Apr. 30, 1918 |
| 1,355,129 | Corby | Oct. 12, 1920 |
| 1,454,422 | Abe | May 8, 1923 |
| 1,773,296 | Block | Aug. 19, 1930 |
| 1,950,418 | Schreier | Mar. 13, 1934 |